(12) United States Patent
Cho et al.

(10) Patent No.: US 9,631,539 B2
(45) Date of Patent: Apr. 25, 2017

(54) APPARATUS FOR GENERATING SUPERHEATED VAPOR USING WAVE FIN

(75) Inventors: Yong Kuk Cho, Busan-si (KR); Tae Jin Kim, Yangsan-si (KR)

(73) Assignee: KORENS CO., LTD., Yangsan-si (KR)

( * ) Notice: Subject to any disclaimer, the term of this patent is extended or adjusted under 35 U.S.C. 154(b) by 264 days.

(21) Appl. No.: 14/360,354

(22) PCT Filed: Feb. 17, 2012

(86) PCT No.: PCT/KR2012/001211
§ 371 (c)(1),
(2), (4) Date: May 23, 2014

(87) PCT Pub. No.: WO2013/089315
PCT Pub. Date: Jun. 20, 2013

(65) Prior Publication Data
US 2014/0352302 A1    Dec. 4, 2014

(30) Foreign Application Priority Data

Dec. 13, 2011    (KR) .......................... 10-2011-0133936

(51) Int. Cl.
*F28F 1/32*    (2006.01)
*F01N 5/02*    (2006.01)
(Continued)

(52) U.S. Cl.
CPC .............. *F01N 5/02* (2013.01); *F01K 23/065* (2013.01); *F01K 23/10* (2013.01); *F01K 25/08* (2013.01);
(Continued)

(58) Field of Classification Search
CPC ...... F28D 1/0477; F28D 1/0478; F28D 7/085; F28D 7/087; F28D 7/1615; F28D 7/1684;
(Continued)

(56) References Cited

U.S. PATENT DOCUMENTS 3,136,038 A * 6/1964 Huggins ................... F28D 7/08
165/151
3,147,800 A * 9/1964 Tadewald ............. B21D 53/085
165/150

(Continued)

FOREIGN PATENT DOCUMENTS

JP    58-013987    1/1983
JP    2002-054887    2/2002

(Continued)

*Primary Examiner* — Jianying Atkisson
*Assistant Examiner* — For K Ling
(74) *Attorney, Agent, or Firm* — Lex IP Meister, PLLC (57) ABSTRACT

An apparatus for generating superheated vapor using waste heat recovery. A housing has an inlet tank and an outlet tank at both ends. Exhaust gas is introduced through the inlet tank, and is discharged through the outlet tank. A plurality of wave fin structures are disposed inside the housing so as to be spaced apart from each other at predetermined distances in a top-bottom direction, and include a plurality of peaks and a plurality of valleys which are connected in a transverse direction so as to form wave-like structures in a direction in which the exhaust gas flows. A plurality of working fluid tubes alternate with the plurality of wave fin structures. An inlet pipe through which working fluid is introduced and an outlet pipe through which the working fluid is discharged are disposed on a side surface of the housing.

4 Claims, 7 Drawing Sheets

(51) Int. Cl.
  *F22B 1/18* (2006.01)
  *F22B 15/00* (2006.01)
  *F01K 23/10* (2006.01)
  *F01K 23/06* (2006.01)
  *F01K 25/08* (2006.01)
  *F28F 9/02* (2006.01)
  *F28F 9/16* (2006.01)
  *F28D 7/08* (2006.01)
  *F28D 21/00* (2006.01)
  *F28F 1/12* (2006.01)

(52) U.S. Cl.
  CPC .............. *F22B 1/18* (2013.01); *F22B 1/1807* (2013.01); *F22B 15/00* (2013.01); *F28D 7/082* (2013.01); *F28D 21/0003* (2013.01); *F28F 1/126* (2013.01); *F28F 9/02* (2013.01); *F28F 9/16* (2013.01); *F28D 2021/0064* (2013.01); *F28F 2009/0297* (2013.01); *Y02E 20/363* (2013.01)

(58) Field of Classification Search
  CPC .... F28F 1/126; F28F 1/32; F28F 9/001; F28F 1/02
  USPC ................ 165/150, 157, 163, 164, 165, 172
  See application file for complete search history.

(56) References Cited

U.S. PATENT DOCUMENTS

| | | | | | |
|---|---|---|---|---|---|
| 3,310,869 | A | * | 3/1967 | La Porte | B21D 53/085 228/183 |
| 4,932,467 | A | * | 6/1990 | Wigmore | F28D 7/04 165/163 |
| 4,966,230 | A | * | 10/1990 | Hughes | F28D 1/035 165/150 |
| 5,314,013 | A | * | 5/1994 | Tanabe | F28D 1/0476 165/176 |
| 5,464,145 | A | * | 11/1995 | Park | B23K 1/0012 228/183 |
| 5,881,456 | A | * | 3/1999 | Bergins | B21D 53/02 165/153 |
| 6,145,589 | A | * | 11/2000 | Gowan | F28F 9/002 165/153 |
| 6,840,313 | B2 | | 1/2005 | Abiko | |
| 6,910,528 | B2 | | 6/2005 | Abiko | |
| 7,267,163 | B2 | * | 9/2007 | Osakabe | F28D 9/0043 165/153 |
| 7,303,002 | B2 | * | 12/2007 | Usui | F28D 7/1684 165/109.1 |
| 2005/0092444 | A1 | * | 5/2005 | Kohlgruber | B01D 1/06 159/2.1 |
| 2006/0101848 | A1 | * | 5/2006 | Taras | F25B 39/00 62/515 |
| 2008/0302518 | A1 | * | 12/2008 | Durdel | F25B 39/00 165/148 |
| 2009/0090486 | A1 | * | 4/2009 | Geskes | F28D 7/06 165/51 |
| 2011/0023518 | A1 | * | 2/2011 | Amaya | F28D 7/0041 62/304 |
| 2014/0120007 | A1 | * | 5/2014 | Valensa | B01J 8/02 422/206 |

FOREIGN PATENT DOCUMENTS

| | | |
|---|---|---|
| JP | 2004-044870 | 2/2004 |
| JP | 2009-133607 | 6/2009 |
| JP | 2010-144979 | 7/2010 |

* cited by examiner

APPARATUS FOR GENERATING SUPERHEATED VAPOR USING WAVE FIN

TECHNICAL FIELD

The present invention relates to an apparatus for generating superheated vapor, and more particularly, to an apparatus for generating superheated vapor using wave fins which can effectively generate superheated vapor of working fluid using waste heat such as from exhaust gas.

BACKGROUND ART

Vehicles use a variety of heat exchangers, such as an exhaust gas recirculation (EGR) cooler, an exhaust gas cooler, a fuel cooler, an oil cooler or an intercooler. Recently, heat exchangers having a variety of structures are configured inside a waste heat recovery system such that they perform heat exchange using various types of fluid.

In general, it is well known that internal combustion engines used in vehicles, vessels, or the like have a very low heat efficiency. Since only about 30% of fuel supplied to internal combustion engines is used as output energy, improvement in fuel efficiency is needed.

Energy that is not extracted as usable mechanical energy is discharged to the air as waste heat, for example, through the discharge of exhaust gas from an internal combustion engine, charge air cooling, or discharge of engine coolant.

Waste heat recovery systems which promote an improvement in the fuel efficiency by actively recovering such waste heat are currently utilized. Recently, a waste heat recovery system having an organic Rankine cycle is used. Such a waste heat recovery system is configured so as to effectively extract mechanical energy from a turbine by converting working fluid into hot vapor by performing heat exchange with the working fluid and then supplying the hot vapor of the working fluid to the turbine.

Such a waste heat recovery system is provided with an apparatus for generating superheated vapor which converts dry saturated vapor of working fluid into superheated vapor using the high-temperature heat of exhaust gas. It is possible to further increase the efficiency of the turbine by supplying the superheated vapor of the working fluid to the turbine.

Since the apparatus for generating superheated vapor of the waste heat recovery system is configured such that the high-temperature and high-pressure working fluid and the high-temperature exhaust gas exchange heat, it is highly possible that the working fluid may leak and the leaking working fluid may cause severe problems inside a vehicle, which are problematic.

DISCLOSURE

Technical Problem

Accordingly, the present invention has been made keeping in mind the above problems occurring in the prior art, and an object of the present invention is to provide an apparatus for generating superheated vapor using waste heat recovery, in which a plurality of wave fin structures and a plurality of working fluid tubes are disposed inside a housing in order to significantly increase the area where exhaust gas that passes through the plurality of wave fin structures comes into contact with working fluid, thereby increasing heat exchange efficiency.

Technical Solution

In order to accomplish the above object(s), the present invention provides an apparatus for generating superheated vapor that includes:

a housing comprising an inlet tank and an outlet tank at both ends, wherein exhaust gas is introduced through the inlet tank, and the exhaust gas is discharged through the outlet tank;

a plurality of wave fin structures which are disposed inside the housing so as to be spaced apart from each other at predetermined distances in a top-bottom direction, wherein each of the plurality of wave fin structures comprises a plurality of peaks and a plurality of valleys which are connected in a transverse direction so as to form wavelike structures in a direction in which the exhaust gas flows; and a plurality of working fluid tubes alternating with the plurality of wave fin structures, wherein an inlet pipe through which working fluid is introduced and an outlet pipe through which the working fluid is discharged are disposed on a side surface of the housing, the inlet pipe and the outlet pipe are connected to the plurality of working fluid tubes so as to communicate each of the plurality of working fluid tubes, and an upper surface and a lower surface of each of the plurality of working fluid tubes are in direct contact with adjacent wave fin structures of the plurality of wave fin structures.

Each of the plurality of working fluid tubes may have a flat surface formed on each of the upper surface and the lower surface, the flat surface of the plurality of working fluid tubes being in direct contact with a corresponding wave fin structure of the plurality of wave fin structures.

Each of the plurality of working fluid tubes may have an oval cross-sectional structure that has a flat surface on each of the upper and lower surfaces.

Each of the plurality of working fluid tubes may be bent into a shape of an S, one end of each of the plurality of working fluid tubes may be connected to the inlet pipe, and the other end of each of the plurality of working fluid tubes may be connected to the outlet pipe.

First and second fitting assemblies may be provided on both ends of the plurality of wave fin structures, each of the first and second fitting assemblies comprising a plurality of fitting slots, and both ends of the plurality of wave fin structures being fitted into the fitting slots of the first and second fitting assemblies.

Advantageous Effects

According to the present invention, it is possible to advantageously minimize the possibility that high-temperature and high-pressure working fluid leak by minimizing thermal stress of the fluid tubes through which the working fluid passes and to significantly improve the heat exchange efficiency of the working fluid by increasing the area where the working fluid that passes through the fluid tubes comes into contact with exhaust gas.

MODE FOR INVENTION

Hereinafter an exemplary embodiment of the present invention will be described in detail in conjunction with the accompanying drawings.

Figure 1:
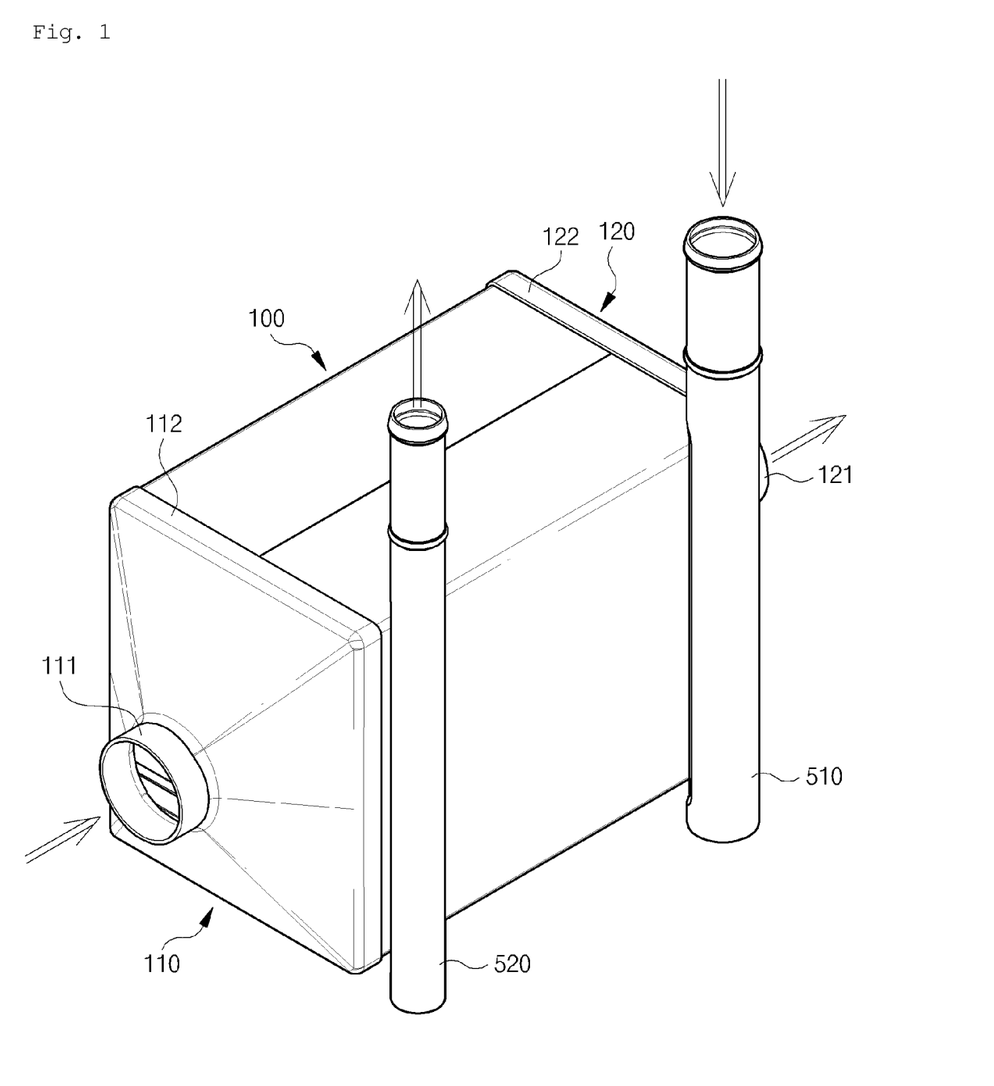
FIG. 1 is a perspective view showing an apparatus for generating superheated vapor according to an embodiment of the present invention.
Figure 2:
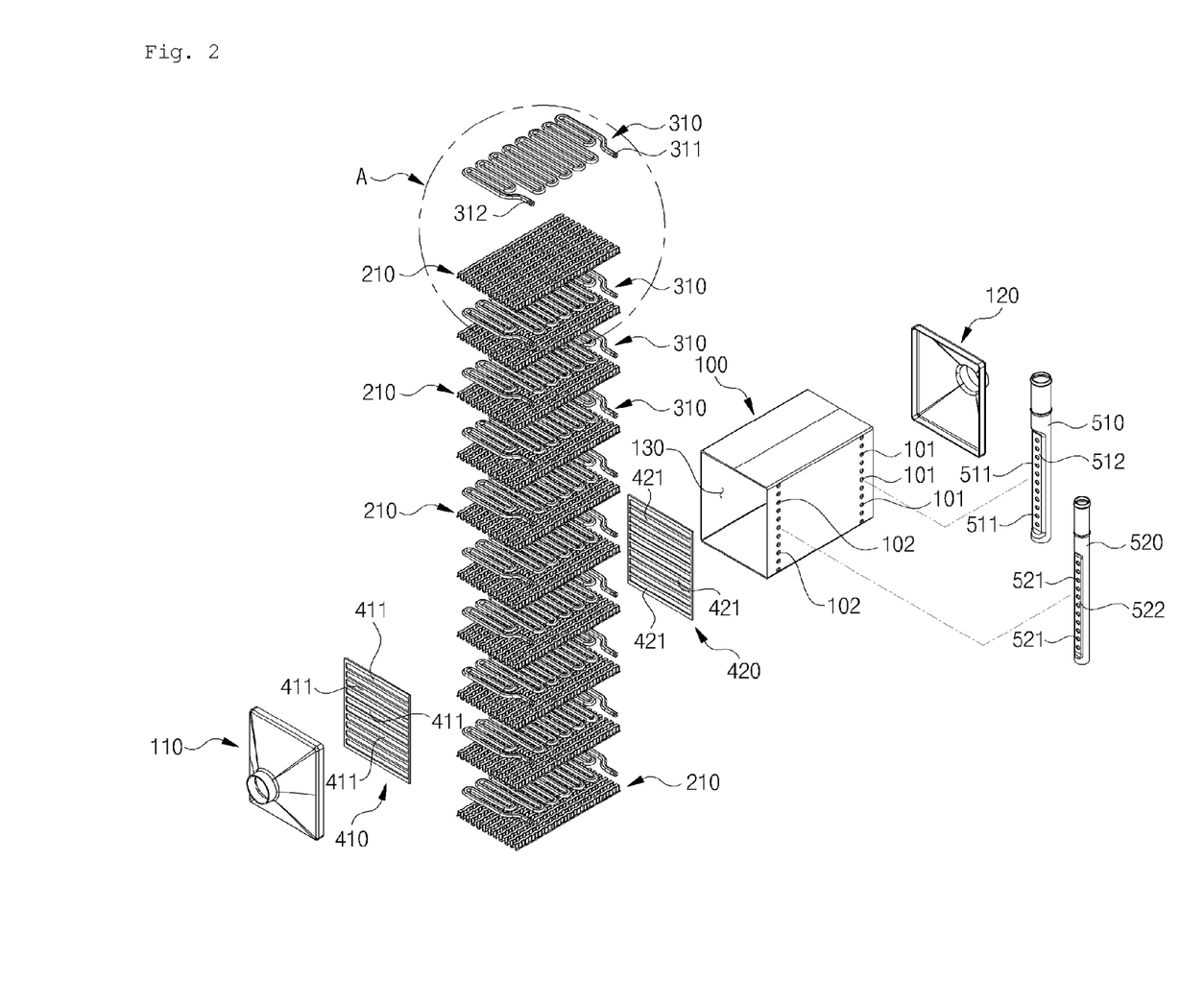
FIG. 2 is an exploded perspective view showing the apparatus for generating superheated vapor according to an embodiment of the present invention.
Figure 3:
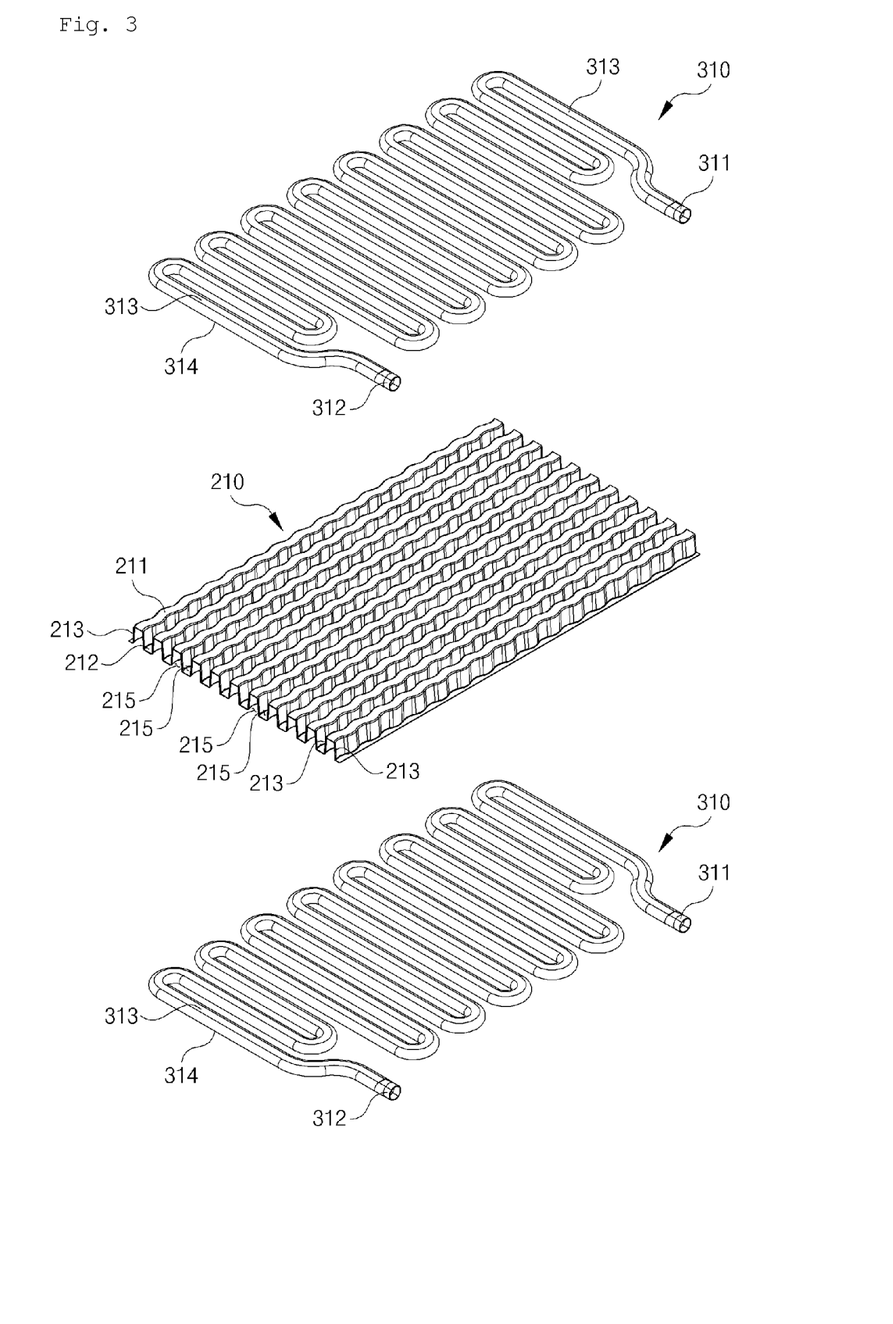
FIG. 3 is an enlarged perspective view of part A in FIG. 2.
Figure 4:
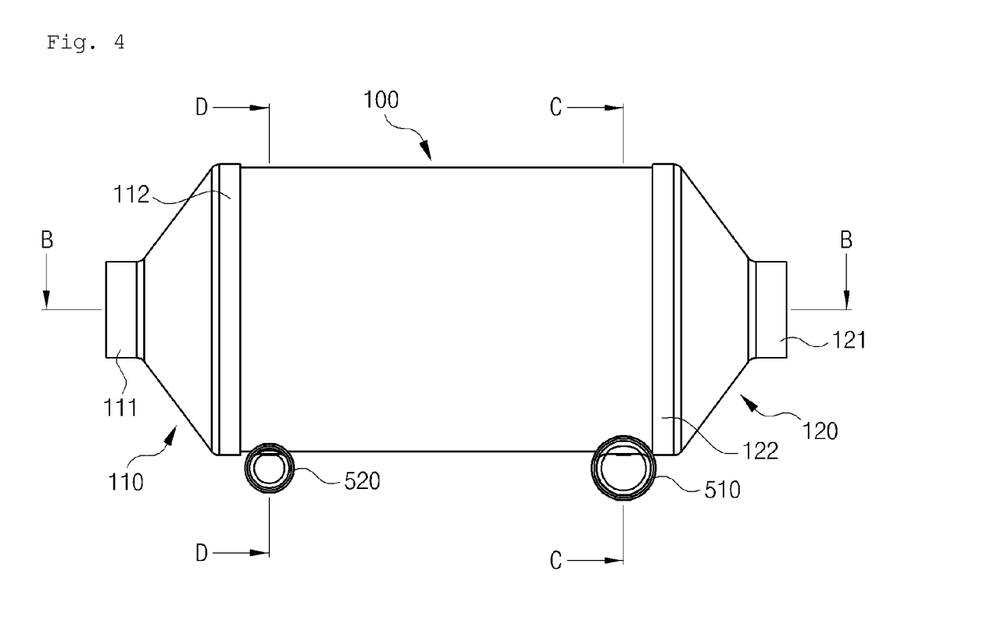
FIG. 4 is a top-plan view showing the apparatus for generating superheated vapor according to an embodiment of the present invention.
Figure 5:
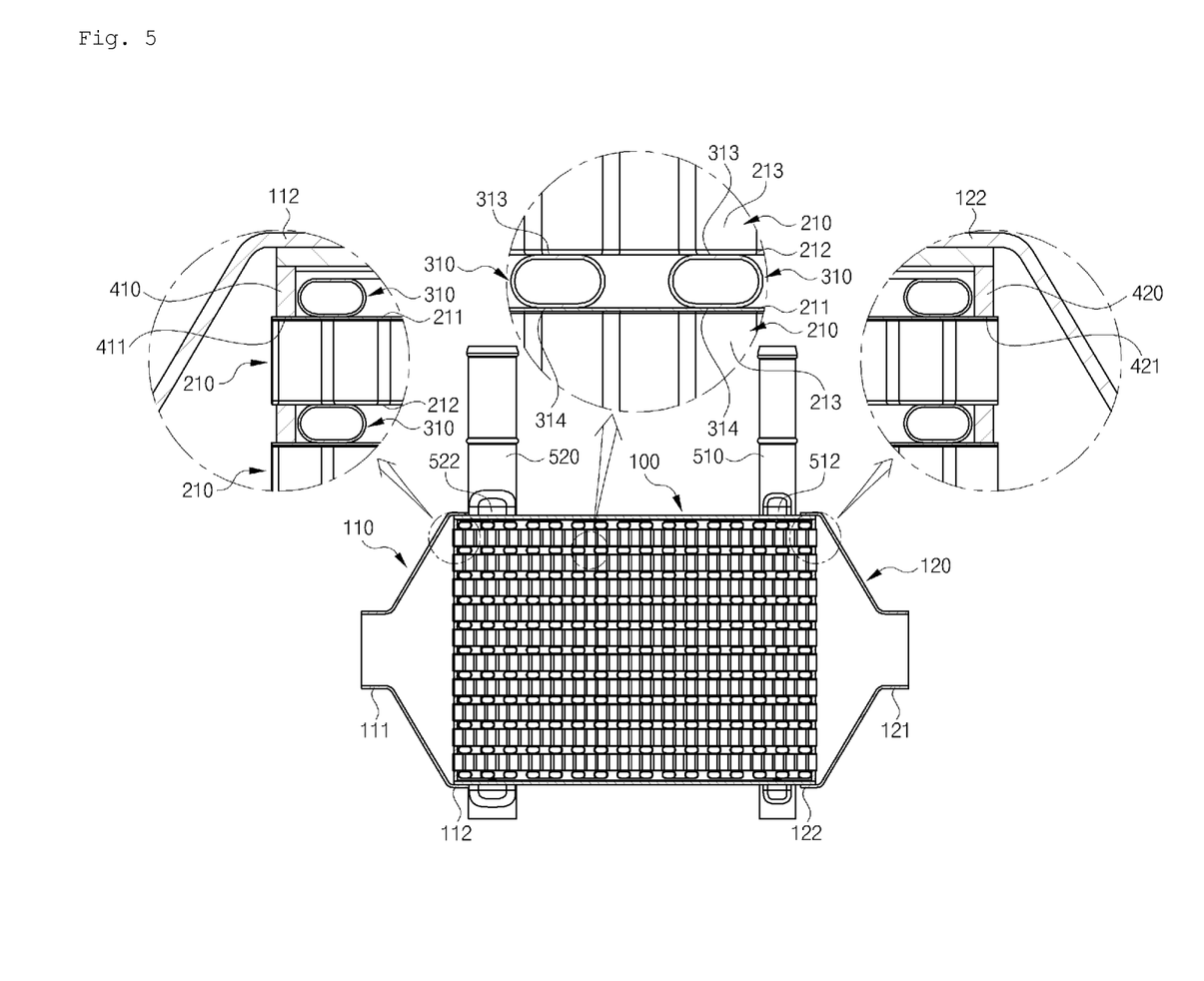
FIG. 5 is a cross-sectional view taken along line B-B in FIG. 4.
Figure 6:
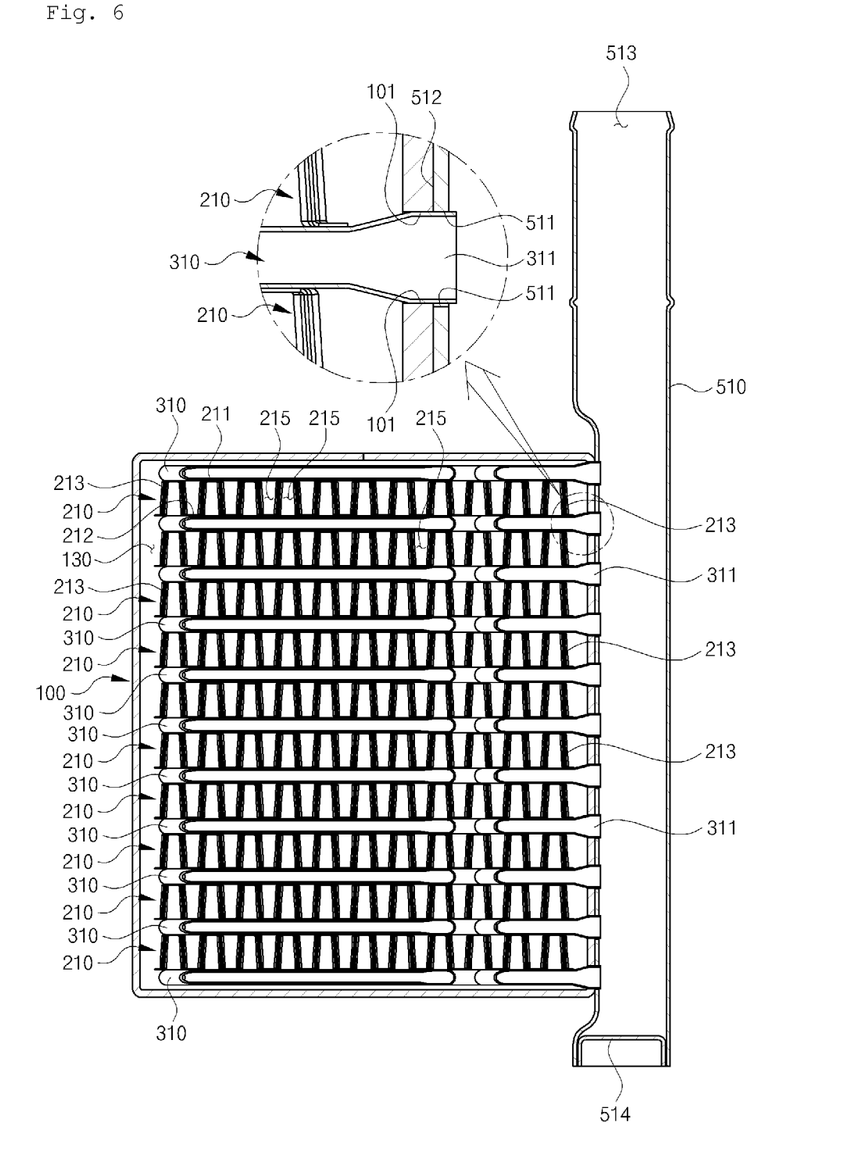
FIG. 6 is a cross-sectional view taken along line C-C in FIG. 4.
Figure 7:
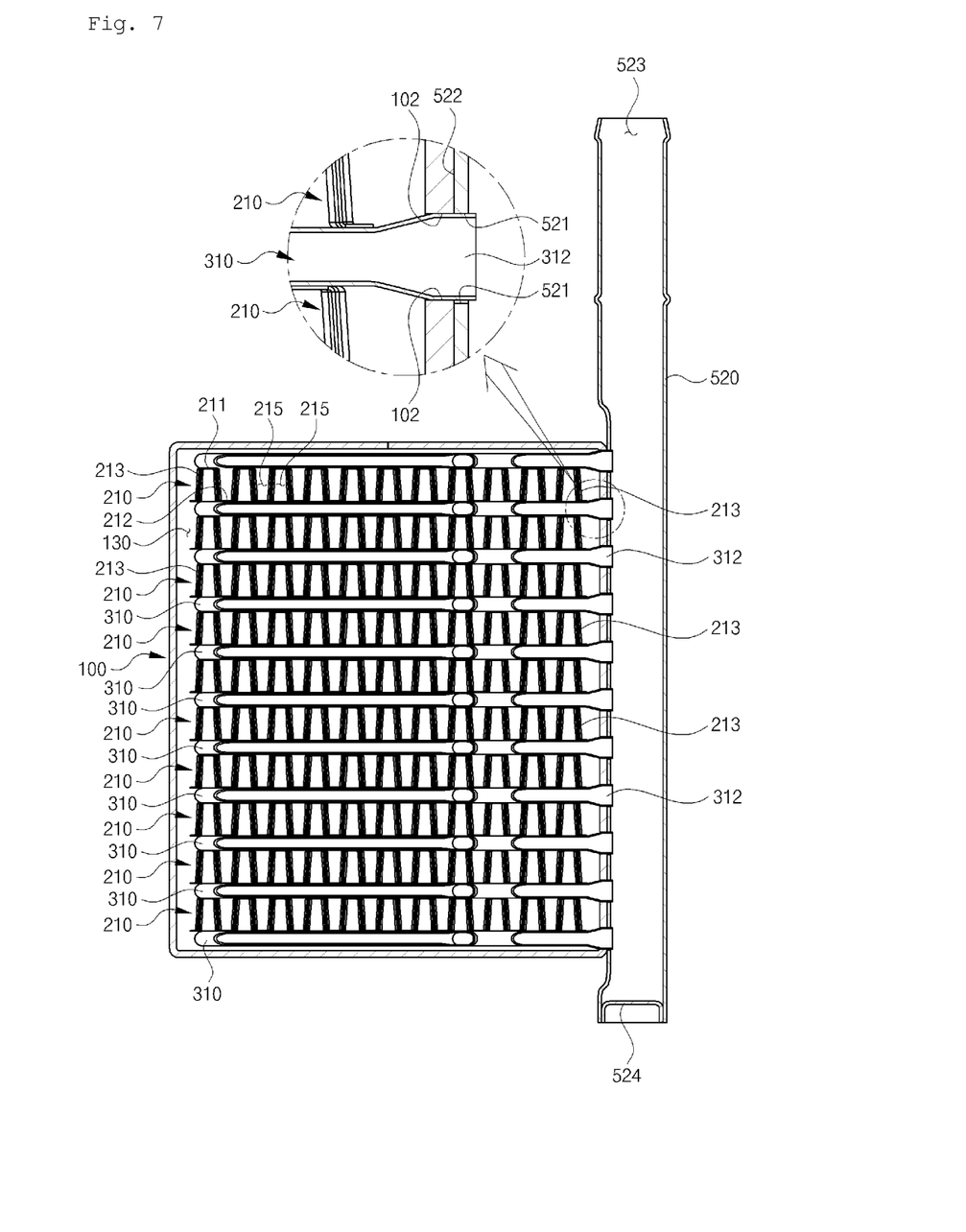
FIG. 7 is a cross-sectional view taken along line D-D in FIG. 4.

FIGS. 1 to 7 show an apparatus for generating superheated vapor using waste heat recovery according to an embodiment of the present invention.

As shown in the figures, the apparatus for generating superheated vapor using waste heat recovery includes a housing 100 which has an inlet tank 110 and an outlet tank 120 at both ends, a plurality of exhaust gas tube structures or wave fin structures 210 which are disposed inside the housing 100 such that the wave fin structures 210 are spaced apart from each other at preset distances in the top-bottom direction, and a plurality of working fluid tubes 310 each of which alternates with the adjacent wave fin structures 210 of the plurality of wave fin structures 210.

The housing 100 is configured as an angled structure, with opposite ends thereof being open. A hollow section 130 is formed inside the housing 100. The inlet tank 110 and the outlet tank 120 are respectively coupled to the both ends of the housing 100. The inlet tank 110 and the outlet tank 120 have the shape of a diffuser. Exhaust gas is introduced into the housing 100 through the inlet tank 110, and the exhaust gas is discharged from the housing 100 through the outlet tank 120 to the outside.

A coupling sleeve 111 protrudes from one end of the inlet tank 110, and an exhaust gas pipe (not shown) is coupled with the coupling sleeve 111. A fitting rim 112 extends from the other end of the inlet tank 110 toward one end of the housing 100. One end of the housing 100 is fitted into the fitting rim 112, and then is coupled with the fitting rim 112 by welding or the like.

A fitting rim 122 extends from one end of the outlet tank 120 toward the other end of the housing 100. A coupling sleeve 121 protrudes from the other end of the outlet tank 120, and an exhaust gas pipe (not shown) is coupled to the coupling sleeve 121. The other end of the housing 100 is fitted into the fitting rim 122, and then is coupled with the fitting rim 122 by welding or the like.

The plurality of wave fin structures 210 are spaced apart from each other at preset distances in the top-bottom direction. Each of the wave fin structures 210 includes a plurality of peaks 211 and a plurality of valleys 212 which are connected together via a plurality of sidewalls 213 so as to form wave-like structures. This consequently forms exhaust gas passages 215 between the peaks 211 and the valleys 212 such that exhaust gas can pass through the exhaust gas passages 215. The plurality of peaks 211 and the plurality of valleys 212 form the wave-like structures in the direction in which exhaust gas flows.

Both ends of the plurality of wave fin structures 210 are disposed at both end sides of the housing 100 through first and second fitting assemblies 410 and 420.

The first fitting assembly 410 has a plurality of fitting slots 411, and is coupled to one end of the housing 100 by welding or the like. The plurality of fitting slots 411 are spaced apart from each other at distances corresponding to the distances of the wave fin structures 210. Accordingly, one ends of the wave fin structures 210 can be respectively fitted into the fitting slots 411 of the first fitting assembly 410 and then be coupled to the first fitting assembly 410 by welding or the like.

The second fitting assembly 420 has a plurality of fitting slots 421, and is coupled to the other end of the housing 100 by welding or the like. The plurality of fitting slots 421 are spaced apart from each other at distances corresponding to the distances of the wave fin structures 210. Accordingly, the other ends of the wave fin structures 210 can be respectively fitted into the fitting slots 421 of the second fitting assembly 420 and then be coupled to the second fitting assembly 420 by welding or the like.

The first and second fitting assemblies 410 and 420 allow the plurality of wave fin structures 210 to be disposed inside the housing 100 in the state in which the plurality of wave fin structures 210 are accurately spaced apart from each other in a top-bottom direction.

The first and second fitting assemblies 410 and 420 are respectively coupled to the both ends of the housing 100 in an airtight fashion. Both ends of the housing 10 can seal other parts than the exhaust gas passages 215 of the wave fin structures 210 in an airtight fashion through the first and second fitting assemblies 410 and 420.

The plurality of working fluid tubes 310 are disposed between the plurality of wave fin structures 210. Each of the plurality of working fluid tubes 310 is bent so as to form a continuous S-shaped structure. The upper surface and the bottom surface of each of the plurality of working fluid tubes 310 are in direct contact with and coupled by welding to adjacent wave fin structures 210 of the plurality of wave fin structures 210.

An inlet pipe 510 through which working fluid is introduced and an outlet pipe 520 and an outlet pipe 520 through which the working fluid is discharged are connected to each of the plurality of working fluid tubes 310. The inlet pipe 510 and the outlet pipe 520 are connected to one side surface of the housing 100 by welding or the like.

The inlet pipe 510 has an open hole 513 at the upper end thereof and a blind hole 514 at the lower end thereof. The working fluid is introduced through the upper open hole 513 of the inlet pipe 510.

The inlet pipe 510 is disposed in the top-bottom direction on one side surface of the housing 100 adjacent to the other end. A flat surface 512 is formed on the outer circumference at one side of the inlet pipe 510. The flat surface 512 is coupled to one side surface of the housing 100 by welding or the like. A plurality of inlet holes 511 is formed in the flat surface 52 of the inlet pipe 510. Through-holes 101 corresponding to the plurality of inlet holes 511 of the inlet pipe 510 are formed in one side surface of the housing 100 adjacent to the other end. One end 311 of each of the working fluid tubes 310 is connected to the inlet pipe 510 adjacent to a corresponding inlet hole of the inlet holes 511 in a sealing fashion after having passed through a corresponding through-hole of the through-holes 101.

An open hole 523 is formed at the upper end of the outlet pipe 520, and a blind hole 524 is formed at the lower end of the outlet pipe 520. Accordingly, working fluid is discharged through the upper open hole 523 of the outlet pipe 520.

The outlet pipe 520 is disposed in the top-bottom direction one side surface of the housing 100 adjacent to one end.

A flat surface 522 is formed on the outer circumference at one side of the outlet pipe 520. The flat surface 512 is coupled to one side surface of the housing 100 by welding or the like. A plurality of outlet holes 521 is formed in the flat surface 522 of the outlet pipe 520. Through-holes 102 corresponding to the plurality of outlet holes 521 of the outlet pipe 520 are formed in one side surface of the housing 100 adjacent to the other end. The other end 312 of each of the working fluid tubes 310 is connected to the outlet pipe 510 adjacent to a corresponding outlet hole of the outlet holes 521 in a sealing fashion after having passed through a corresponding through-hole of the through-holes 102.

Flat surfaces 313 and 314 are respectively formed on the upper and lower surfaces of each of the working fluid tubes 310. The flat surfaces 313 and 314 of the working fluid tubes 310 are configured so as to directly adjoin to adjacent wave fin structures of the wave fin structures 210. In this fashion, the working fluid tubes 310 are configured so as to be in face-to-face contact with the peaks 211 or valleys 212 of the wave fin structures 210. Accordingly, there is an advantage in that the heat exchange efficiency of the working fluid that passes through the working fluid tubes 310 is significantly increased.

It is preferred that each of the working fluid tubes 310 is configured so as to have an oval cross-section. The structure having this oval cross-section can minimize the concentration of thermal stress when the high-temperature and high-pressure working fluid is passing through the working fluid tubes 310, thereby preventing the working fluid tubes 310 from being damaged or broken.

It is preferred that the cross-section of the both ends 311 and 312 of the working fluid tubes 310 be circular in order to facilitate sealing connection to the inlet pipe 510 and the outlet pipe 520.

Reference will now be made to the operation of the present invention having the above-described configuration.

When hot exhaust gas is introduced toward the inlet tank 110 of the housing 100, the hot exhaust gas passes through the exhaust gas passages 215 of the wave fin structures 210 inside the housing, and then is discharged toward the outlet tank 120.

In the state in which the exhaust gas passes through the plurality of wave fin structures 210 in this fashion, the dry saturated vapor of the working fluid is introduced into the working fluid tubes 310 through the inlet pipe 510, and passes through the plurality of working fluid tubes 310 while performing heat exchange with the hot exhaust gas that passes through the exhaust gas passages 215 of the wave fin structures 210. Consequently, the dry saturated vapor of the working fluid can be converted into overheated vapor and then be discharged through the outlet pipe 520.

According to the present invention as set forth above, since the working fluid tubes 310 have the oval cross-sectional structure, it is possible to advantageously minimize the thermal stress induced to the working fluid tubes 310 through which the high-temperature and high-pressure working fluid passes. It is also possible to advantageously increase the heat exchange efficiency of the working fluid that passes through the working fluid tubes 310 by increasing the contact area for heat exchange between the working fluid and the exhaust gas.

In particular, according to the present invention, the plurality of wave fin structures 210 and the plurality of working fluid tubes 310 are disposed inside the hollow section 130 of the housing 100. With this configuration, the housing 100 closes the outer portions of the working fluid tubes 310 in an airtight fashion. Even if the high-temperature and high-pressure working fluid leaks from the working fluid tubes 310, it is possible to reliably prevent the working fluid from leaking out of the housing 100.

The invention claimed is:

1. An apparatus for generating superheated vapor comprising:
    a housing comprising an inlet tank and an outlet tank at both ends, wherein an exhaust gas is introduced through the inlet tank, and the exhaust gas is discharged through the outlet tank;
    a plurality of wave fin structures which are disposed inside the housing so as to be spaced apart from each other at predetermined distances in a top-bottom direction, wherein each of the plurality of wave fin structures comprises a plurality of peaks and a plurality of valleys which are connected in a transverse direction so as to form wave-like structures in a direction in which the exhaust gas flows;
    a plurality of working fluid tubes alternating with the plurality of wave fin structures; and
    first and second fitting assemblies provided on both ends of the plurality of wave fin structures,
    wherein each of the first and second fitting assemblies comprises a rectangular frame and a plurality of bars of which both ends are connected to the rectangular frame, the plurality of bars are parallel with each other and form a plurality of fitting slots extended in a direction perpendicular to the top-bottom direction along with the rectangular frame,
    wherein an inlet pipe through which working fluid is introduced and an outlet pipe through which the working fluid is discharged are disposed on a side surface of the housing, the inlet pipe and the outlet pipe are connected to the plurality of working fluid tubes so as to communicate each of the plurality of working fluid tubes, and an upper surface and a lower surface of each of the plurality of working fluid tubes are in direct contact with adjacent wave fin structures of the plurality of wave fin structures,
    wherein the inlet pipe has an open hole at an upper end of the inlet pipe, a blind hole at a lower end of the inlet pipe, a flat surface formed on an outer circumference at one side of the inlet pipe, and a plurality of inlet holes formed in the flat surface of the inlet pipe, and the outlet pipe has an open hole at an upper end of the outlet pipe, a blind hole at a lower end of the outlet pipe, a flat surface formed on an outer circumference at one side of the outlet pipe, and a plurality of outlet holes formed in the flat surface of the outlet pipe,
    wherein the inlet pipe communicates with the plurality of working fluid tubes through the plurality of inlet holes and the outlet pipe communicates with the plurality of working fluid tubes through the plurality of outlet holes,
    wherein both ends of the plurality of wave fin structures are fitted into the fitting slots of the first and second fitting assemblies, and the plurality of wave fin structures are disposed between the first and the second fitting assemblies, and
    wherein the first fitting assembly is disposed between the inlet tank and the plurality of working fluid tubes and the second fitting assembly is disposed between the outlet tank and the plurality of working fluid tubes.

2. The apparatus according to claim 1, wherein each of the plurality of working fluid tubes has a flat surface formed on each of the upper surface and the lower surface, the flat surface of the plurality of working fluid tubes being in direct contact with a corresponding wave fin structure of the plurality of wave fin structures.

3. The apparatus according to claim 1, wherein each of the plurality of working fluid tubes has an oval cross-sectional structure that has a flat surface on each of the upper and lower surfaces.

4. The apparatus according to claim 1, wherein each of the plurality of working fluid tubes is bent into a shape of an S, one end of each of the plurality of working fluid tubes is connected to the inlet pipe, and the other end of each of the plurality of working fluid tubes is connected to the outlet pipe.

* * * * *